(12) United States Patent
Masui et al.

(10) Patent No.: US 8,178,590 B2
(45) Date of Patent: May 15, 2012

(54) BLOCK COPOLYMER AND USE THEREOF

(75) Inventors: Kentaro Masui, Tsukuba (JP); Shigeru Sasaki, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1299 days.

(21) Appl. No.: 11/802,916

(22) Filed: May 25, 2007

(65) Prior Publication Data

US 2007/0281195 A1 Dec. 6, 2007

(30) Foreign Application Priority Data

May 31, 2006 (JP) .................................. 2006-151279

(51) Int. Cl.
*B01J 41/00* (2006.01)
(52) U.S. Cl. ................ 521/39; 521/25; 521/27; 429/42; 429/314; 502/159
(58) Field of Classification Search ...................... 521/39, 521/25, 27; 429/42, 314; 502/159
See application file for complete search history.

(56) References Cited

U.S. PATENT DOCUMENTS

| | | | |
|---|---|---|---|
| 6,355,149 B1 | 3/2002 | Soczka-Guth et al. | |
| 6,828,407 B2 * | 12/2004 | Sasaki et al. | 528/86 |
| 2004/0186262 A1 | 9/2004 | Maier et al. | |
| 2007/0066759 A1 | 3/2007 | Onodera et al. | |
| 2007/0083010 A1 | 4/2007 | Onodera et al. | |
| 2007/0196712 A1 * | 8/2007 | Kim et al. | 429/33 |

FOREIGN PATENT DOCUMENTS

| | | |
|---|---|---|
| CA | 2 542 687 A1 | 4/2005 |
| CA | 2542687 A1 * | 4/2005 |
| DE | 197 54 305 A1 | 6/1999 |
| EP | 1 669 391 A1 | 6/2006 |
| EP | 1 674 498 A1 | 6/2006 |
| EP | 1674498 A1 * | 6/2006 |
| EP | 1862489 A1 * | 12/2007 |
| JP | 2003-031232 | 1/2003 |
| JP | 2004-359925 | 12/2004 |
| JP | 2005-126684 | 5/2005 |
| JP | 2005-139432 | 6/2005 |
| WO | WO-03/095509 A1 * | 11/2003 |
| WO | WO 03/095509 A1 | 11/2003 |
| WO | WO 2004/042839 A2 | 5/2004 |
| WO | WO-2004/042839 A2 * | 5/2004 |

OTHER PUBLICATIONS

Ticianelli, E.A., Methods to Advance Technology of Proton Exchange Membrane Fuel Cells:, J. Electrochem. Soc.: Electrochemical Science and Technology, Sep. 1988, vol. 135, No. 9, p. 2209-2214.

* cited by examiner

*Primary Examiner* — Peter D. Mulcahy
*Assistant Examiner* — Henry Hu
(74) *Attorney, Agent, or Firm* — Foley & Lardner LLP

(57) ABSTRACT

A polymer electrolyte satisfying both of proton conductivity and chemical stability such as water resistance at a high level that is preferable as the polymer electrolyte for fuel cells and the like is provided. The invention includes a block copolymer comprising one or more segments having an ion exchange group and one or more segments having substantially no ion exchange group, wherein at least one of the segments having an ion exchange group is the segment represented by the following general formula (1A), (1B) or (1C):

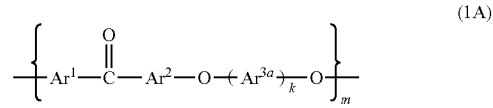

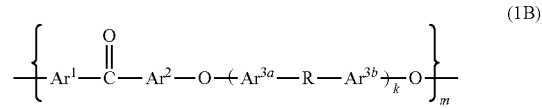

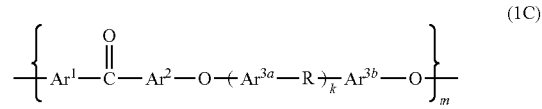

and the segment has ion exchange group density of 4.0 meq/g or more, and the segments having substantially no ion exchange group is the segment represented by the following general formula (2):

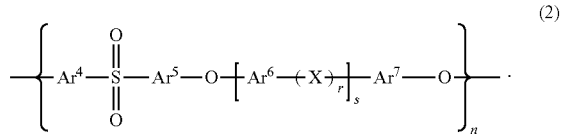

10 Claims, No Drawings

BLOCK COPOLYMER AND USE THEREOF

BACKGROUND OF THE INVENTION

1. Field of the Invention

The present invention relates to a block copolymer preferably used as a polymer electrolyte, in particular, as a member for a fuel cell.

2. Description of the Related Art

A polymer having proton conductivity, namely a polymer electrolyte is used for materials constituting a barrier membrane of electrochemical devices such as a primary cell, a secondary cell and a solid polymer fuel cell. For example, polymer electrolytes in which a polymer having perfluoroalkylsulfonic acid as a super strong acid in the side chains and a perfluoroalkane chain in the main chain is an active component, such as NAFION (Registered TradeMark of EI DuPont de Nemours & Company), have been conventionally used mainly because of the superior electric generation property when they are used as a barrier membrane material for a fuel cell. However, problems have been indicated that this kind of material is very expensive, heat resistance is low, membrane strength is low and it cannot be practically used without any reinforcement, etc.

Under these circumstances, the development of a polymer electrolyte with low price and superior in performance that can replace the above-mentioned polymer electrolytes has been recently activated.

For example, there is proposed a block copolymer comprising a segment having no sulfonic acid group and a segment having a sulfonic acid group, in which the former segment is polyethersulfone and the latter segment has the ether bound moieties of diphenylsulfone with bisphenol having a sulfonic acid group as a repeating unit (for example, refer to Japanese Unexamined Patent Publication No.2003-031232). However, the further improvement of proton conductivity. (ion conductivity) is desired for practical use of fuel cells and when the total number of ion exchange groups is increase for merely improving the ion conductivity, water resistance tends to be deteriorated.

SUMMARY OF THE INVENTION

The invention provides a polymer electrolyte satisfying both of the proton conductivity and water resistance at a high level that is preferable as the polymer electrolyte for fuel cells and the like.

The present inventors have intensively studied in order to find a block copolymer exhibiting more superior performance as a polymer electrolyte applied for an ion conductive membrane for fuel cells or the like, as a result, have found that a specific block copolymer can solve the above-mentioned problems, and have studied further variously to complete the present invention.

Namely, the present invention provides the followings:

[1] a block copolymer comprising one or more segments having an ion exchange group and one or more segments having substantially no ion exchange group, wherein at least one of the segments having an ion exchange group is the segment represented by the following general formula (1A), (1B) or (1C):

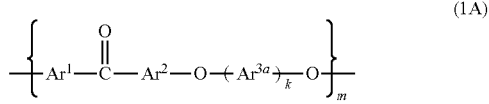

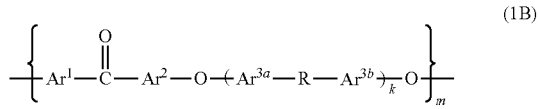

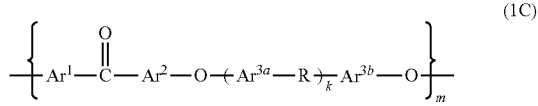

wherein m represents an integer of 5 or more; k represents 1 or 2 ; $Ar^1$ , $Ar^2$ , $Ar^{3a}$ and $Ar^{3b}$ each independently represent divalent aromatic groups, which may have a hydrocarbon group having 1 to 20 carbon atoms which may have a substituent, an alkoxy group having 1 to 20 carbon atoms which may have a substituent, an acyl group having 1 to 20 carbon atoms which may have a substituent, an aryloxy group having 6 to 20 carbon atoms which may have a substituent, or an aryl carbonyl group having 7 to 20 carbon atoms which may have a substituent: at least one of $Ar^1$ and $Ar^2$ has an ion exchange group and $Ar^{3a}$ and $Ar^{3b}$ may have an ion exchange group or not; R represents an oxygen atom, an alkylene group having 1 to 6 carbon atoms or a fluoro-substituted alkylene group having 1 to 6 carbon atoms; and, in the case of a plurality of R's, they may be the same or different, and the segment has ion exchange group density of 4.0 maq/g or more, and at least one of the segments having substantially no ion exchange group is the segment represented by the following general formula (2):

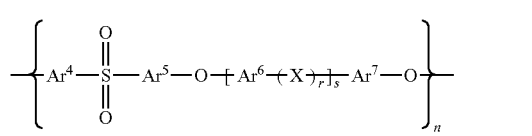

wherein n represents an integer of 5 or more; $Ar^4$, $Ar^5$, $Ar^6$ and $Ar^7$ each independently represent divalent aromatic groups, which may have a hydrocarbon group having 1 to 20 carbon atoms which may have a substituent, an alkoxy group having 1 to 20 carbon atoms which may have a substituent, an acyl group having 1 to 20 carbon atoms which may have a substituent. an aryloxy group having 6 to 20 carbon atoms which may have a substituent, an aryl carbny group having 7 to 20 carbon atoms which may have a substituent or a fluoro group; r represents 0 or 1 and a represents 0, 1 or 2; and X represents a direct bond or a divalent group selected from:

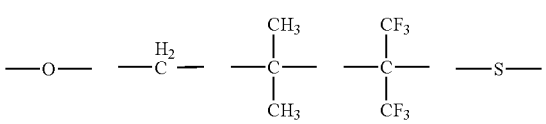

-continued

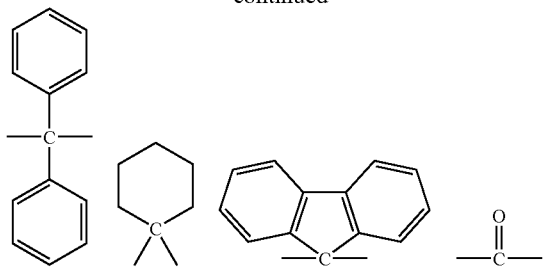

and, in the case of a plurality of X's, they may be the same or different.

The above-mentioned block copolymer Is preferably the following [2] as the mode regarding the content of the segments:

[2] the block copolymer of the above-mentioned [1], wherein the weight composition ratio of the segments having an ion exchange group to the segments having substantially no ion exchange group is represented by [segments having an ion exchange group]/[segments having substantially no ion exchange group] and is 3/97 to 70/30.

Further, the present invention provides the following [3] to [5] as preferable modes regarding ion exchange group of the above-mentioned block copolymer:

[3] the block copolymer of the above-mentioned [1] or [2], wherein the ion exchange group is an acid group:

[4] the block copolymer of the above-mentioned [1] or [2], wherein the ion exchange group is a strong acid group or a super strong acid group; and

[5] the block copolymer of the above-mentioned [1] or [2], wherein the ion exchange group is a sulfonic acid group.

The above-mentioned block copolymer preferably have the segment having a sulfonic acid group being a strong acid group among of the above-mentioned preferable ion exchange groups, and the following [6] is provided:

[6] the block copolymer according to the above-mentioned [1] or [2], wherein at least one of the segments having an ion exchange group is the segment represented by the following general formula (4):

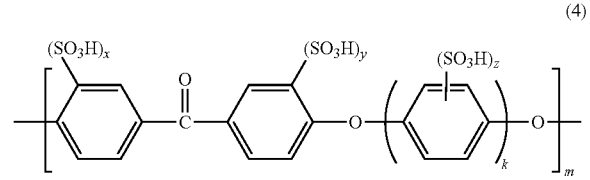

wherein m and k represent the same meaning as above; x represents 0 or 1; y represents 0 or 1; x+y is 1 or 2; and z represents 0, 1 or 2.

Further, when the block copolymer of the invention is the following [7], it is preferable because a polymer electrolyte membrane more superior in ion conductivity is obtained:

[7] the block copolymer according to any one of the above-mentioned [1] to [6], wherein the ion exchange capacity is 0.5 meq/g to 4.0 meq/g.

Further, the present invention provides the following [8] to [11] that are related to the block copolymer according to any one of the above-description;

[8] a polymer electrolyte comprising the block copolymer according to any one of the above-mentioned [1] to [7] as a main component;

[9] a polymer electrolyte membrane comprising a polymer electrolyte according to the polymer electrolyte of the above-mentioned [8];

[10] a polymer electrolyte composite membrane comprising the polymer electrolyte of the above-mentioned [8] and a porous substrate; and

[11] a catalyst composition comprising the polymer electrolyte of the above-mentioned [8] and a catalyst component.

Further, the "main component" indicates that the block copolymer of the invention Is a component mainly assuming ion conductivity and indicates that the block copolymer is usually contained by 80% by weight or more in the polymer electrolyte.

Further, the invention provides the following [12] as a fuel cell:

[12] a polymer electrolyte fuel cell having at least one membrane among the polymer electrolyte membrane of the above-mentioned [9], the polymer electrolyte composite membrane of the above-mentioned [10] and the catalyst layer comprising the catalyst composition of the above-mentioned [11].

The block copolymer of the invention exhibits superior performance in various properties such as water resistance and ion conductivity as a polymer electrolyte, in particular, the ion conductive membrane of a fuel cell. Since the ion conductive membrane obtained from the block copolymer exhibits high power generation property, it is useful industrially.

DETAILED DESCRIPTION OF THE PREFERRED EMBODIMENTS

The invention is Illustrated below in detail.

The block copolymer of the invention is a block copolymer comprising one or more segments having an ion exchange group and one or more segments having substantially no ion exchange group, wherein at least one of the segments having an ion exchange group is the segment represented by the above-mentioned general formula (1A), (1B) or (1C).

$Ar^1$, $Ar^2$, $Ar^{3a}$ and $Ar^{3b}$ in the above-mentioned general formulae (1A), (1B) and (1C) each independently represent divalent aromatic groups, and examples of the divalent aromatic groups include hydrocarbon aromatic groups such as phenylene group, naphthylene group, biphenylene group and fluorenediyl group; hetero aromatic groups such as pyridinediyl group, quinoxalinediyl group and thiophenedlyl group, etc. Divalent hydrocarbon aromatic groups are preferable.

Here, the divalent aromatic groups may have a hydrocarbon group having 1 to 20 carbon atoms which may have a substituent, an alkoxy group having 1 to 20 carbon atoms which may have a substituent, an acyl group having 1 to 20 carbon atoms which may have a substituent, an aryloxy group having 6 to 20 carbon atoms which may have a substituent, or an aryl carbonyl group having 7 to 20 carbon atoms which may have a substituent.

Examples of the hydrocarbon group having 1 to 20 carbon atoms which may have a substituent include alkyl groups such as methyl group, ethyl groups n-propyl group, isopropyl group, n-butyl group, sec-butyl group, tert-butyl group, isobutyl group, n-pentyl group, 2,2-dimethylpropyl group, cyclopentyl group, n-hexyl group, cyclohexyl group, 2-methylpentyl group, 2-ethylhexyl group, octyl group, decyl group, adamantyl group, dodecyl group, octadecyl group and icosyl group; alkenyl groups having a carbon-carbon double bond, alkynyl groups having a carbon-carbon triple bond, and groups having a carbon-carbon doble bond and carbon-carbon triple bond, that are obtained by eliminating hydrogen atoms from the alkyl groups; aryl groups such as phenyl group and naphthyl group. Further, there is mentioned a hydrocarbon group having a total of 1 to 20 carbon atoms in which these groups are substituted with halogen atoms such as fluorine atom, chlorine atom, bromine atom and iodine atom; hydroxyl group, nitrile group, amino group, methoxy group, ethoxy group, isopropyloxy group, phenyl group, naphthyl group. phenoxy group, naphthyloxy group and the like.

Examples of the alkoxy group having 1 to 20 carbon atoms which may have a substituent include alkoxy groups having 1 to 20 carbon atoms such as methoxy group, ethoxy group, n-propoxy group, isopropyloxy group, n-butyloxy group, isobutyloxy group, sec-butyloxy group, tert-butyloxy group, n-pentyloxy group, 2,2-dimethylpropyloxy group, cyclopentyloxy group, n-hexyloxy group, cyclohexyloxy group, 2-methylpentyloxy group, 2-ethylhexyloxy group, decyloxy group, adamantyloxy group, dodecyloxy group, octadecyloxy group and icocyloxy group. Further, there is mentioned an alkoxy group having a total of 1 to 20 carbon atoms in which these groups are substituted with halogen atoms such as fluorine atom, chlorine atom, bromine atom and iodine atom; hydroxyl group, nitrile group, amino group, methoxy group, ethoxy group, isopropyloxy group, phenyl group, naphthyl group, phenoxy group, naphthyloxy group and the like.

Examples of the acyl group having 1 to 20 carbon atoms which has a substituent include acyl groups such as formyl group, acetyl group, n-propionyl group, isobutyryl group, butyryl group, tert-butylcarbonyl group, n-pentylcarbonyl group, cyclopentylcarbonyl group, n-hexylcarbonyl group, cyclohexyloarbonyl group, 2-methylpentylcarbonyl group, 2-ethylhexylcarbonyl group, decylcarbonyl group, adamantylcarbonyl group, dodecylcarbonyl group and octadecylcarbonyl group. Further, there is mentioned an acyl group having a total of 1 to 20 carbon atoms In which these groups are substituted with halogen atoms such as fluorine atom, chlorine atom, bromine atom and iodine atom; hydroxyl group, nitrile group, amino group, methoxy group, ethoxy group, isopropyloxy group, phenyl group, naphthyl group, phenoxy group, naphthyloxy group and the like.

Examples of the arylaxy group having 6 to 20 carbon atoms which may have a substituent include aryloxy groups such as phenoxy group and naphthyloxy group. Further, there is mentioned an aryloxy group having a total of 6 to 20 carbon atoms in which these groups are substituted with halogen atoms such as fluorine atom, chlorine atom, bromine atom and iodine atom; hydroxyl group, nitrile group, amino group, methoxy group, ethoxy group, isopropyloxy group, phenyl group, naphthyl group, phenoxy group and the like.

Examples of the aryl carbonyl group having 7 to 20 carbon atoms which may have a substituent include aryl carbonyl groups such as benzoyl group and naphthoyl group. Further, there is mentioned an aryl carbonyl group having a total of 7 to 20 carbon atoms in which these groups are substituted with halogen atoms such as fluorine atom, chlorine atom, bromine atom and iodine atom; hydroxyl group, nitrile group, amino group, methoxy group, ethoxy group, isopropyloxy group, phenyl group, naphthyl group, phenoxy group and the like.

$Ar^1$, $Ar^2$, $Ar^{3a}$ and $Ar^{3b}$ in the general formulae (1A), (1B) and (1C) each independently represent divalent aromatic groups which may have a substituent, and among these, $Ar^1$ and $Ar^2$ are each preferably phenylene group and $Ar^{3a}$ and $Ar^{3b}$ are each dependently preferably phenylene group, biphenylylene group or naphthylene group.

Among $Ar^1$, $Ar^2$, $Ar^{3a}$ and at least one of $Ar^1$ and $Ar^2$ has an ion exchange group and $Ar^{3a}$ and $Ar^{3b}$ may or may not have an ion exchange group, but preferably have it. Further, it is more preferable that all of the divalent aromatic groups ($Ar^1$, $Ar^2$ and $Ar^{3a}$ in case of the segment represented by the general formula (1A) and $Ar^1$, $Ar^2$, $Ar^{3a}$ and $Ar^{3b}$ in case of the segment represented by the general formula (1B) or (1C) that constitute the segment having an ion exchange group have an ion exchange group.

Further, the segment represented by the general formula (1A), (1B) or (1C) is the segment having an ion exchange group density of 4.0 meq/g or more, is preferably the segment having an ion exchange group density of 4.0 to 8.0 meq/g. Hereat, the ion exchange group density is the value determined from the number of the Ion exchange group and the molar mass in the structural unit that constitutes the segment. The ion exchange group density can be calculated by determining the structural unit of the segment having an ion exchange group, and the structural unit can be determined by the combination of monomers that induce the segment, in the production process of the block copolumer the invention described after. The details are mentioned later.

The weight composition ratio of the segment having an ion exchange group to the segment having substantially no ion exchange group is not specifically limited, but the weight composition ratio, represented by [segment having an ion exchange group]/[segment having substantially no ion exchange group], is usually 3/97 to 70/30, preferably 5/95 to 60/40, further preferably 10/90 to 50/50 and particularly preferably 20/80 to 40/60. When the weight composition ratio is within the above-mentioned range, it is preferable as the polymer electrolyte used in the ion conductive membrane for fuel cells because those having the proton conductivity and water resistance at a higher level are obtained.

The weight composition ratios of respective segments according to these block copolymers can be controlled by the production process of the block copolymers and the production process is described later.

Examples of the ion exchange group according to the block copolymer include weak acid groups such as carboxylic acid group ($—CO_2H$) and phosphonic acid group ($—PO_3H_2$); strong acid groups such as sulfonic acid group ($—SO_3H$); super strong acid groups such as perfluoroalkylenesulfonic acid ($—R^{10}—SO_3H$: $R^{10}$ represents a perfluoroalkylene group having 1-10 carbon atoms), perfluorophenylenesulfonic acid group ($—R^{11}—SO_3H$: $R^{11}$ represents a perfluorophenylene group) and perfluoroalkylenesulfonylimide group ($—R^{12}—SO_2NHSO_2—$: $R^{12}$ represents a perfluoroalkylene group having 1-10 carbon atoms) when exemplified in form of free acid; weak base groups such as amino group, dimethylamino group and diethylamino group; strong base groups such as a trimethylammonio group ($—N^+(CH_3)_3$), a triethylammonio group ($—N^+(C_2H_5)_3$) and a benzylmethylammonio group ($—N^+(CH_3)_2(CH_2C_6H_5)$): and the like. These may be directly bonded with an aromatic ring and it may be a mode in which a divalent group is bonded as a spacer.

Among the ion exchange groups, it is particularly preferable as use for fuel cells that the acid group is an ion exchange group. In particular, among the acid groups, the strong acid group and the super strong acid group are preferable and for example, sulfonic acid, perfluoroalkylenesulfonic acid, perfluorophenylenesulfonic acid and the like are preferably used.

Preferable examples of the segments represented by the general formula (1A), (1B) or (1C) include the following formulae (1A)-1 to (1A)-3 and (1B)-1 to (1B)-4 that express an ion exchange group in sulfonic acid group being preferable example of it. The segments represented by the formulae (1A)-1 and (1A)-2 are more preferable and the formula (1A)-1 is particularly preferable.

In the formulae, m and k represent the same meaning as above. x and y each independently represent 0 or 1 but x+y is 1 or 2. z represents 0, 1 or 2.

As described above, the typical examples of the formulae (1A)-1 and (1A)-2 being the preferable segments include, for example, the following formulae (1A)-4 to (1A)-17:

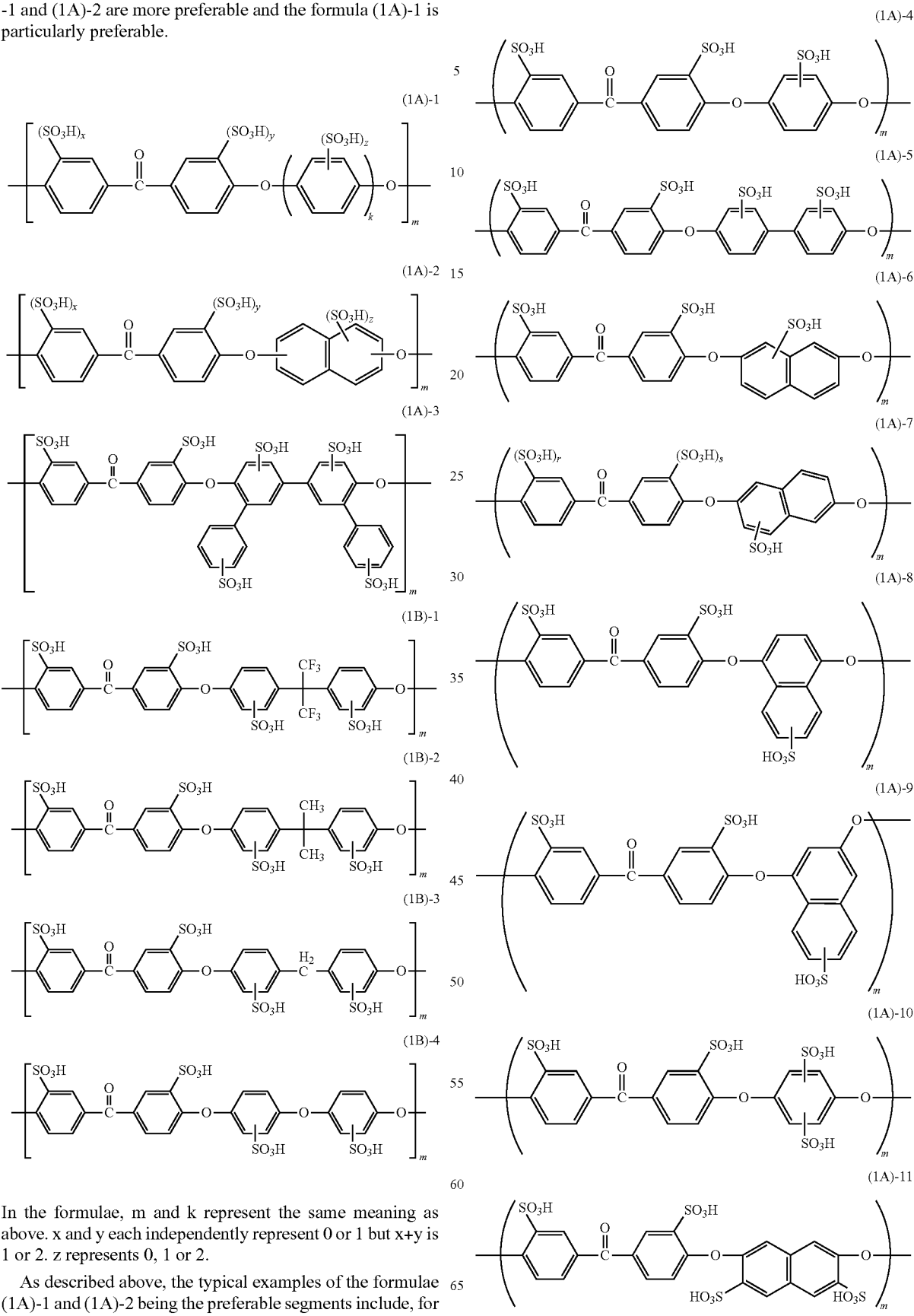

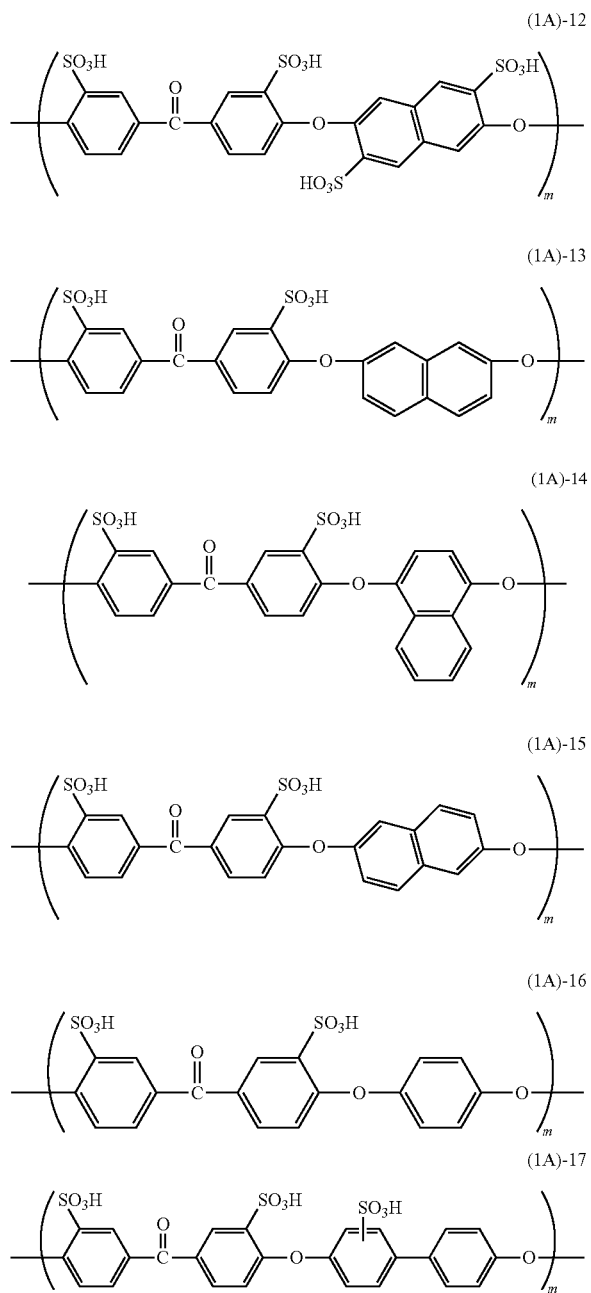

(1A)-12
(1A)-13
(1A)-14
(1A)-15
(1A)-16
(1A)-17

Among these examples, the segment which all of the divalent aromatic group a constituting the segment has an ion exchange group is preferable and the formulae (1A)-4 to (1A)-12 are preferable from the viewpoint.

Further, as described above, the segments having a sulfonic acid group as the ion exchange group are preferable as the ion conductive membrane for fuel cells.

Hereat, a method of determining the ion exchange group density by calculation is illustrated with reference to the above-mentioned formulae (1A)-4 and (1A)-5 that are the segments having preferable ion exchange groups. A structural unit constituting such segments is respectively represented by the following formulae (1A)-4U and (1A)-5U:

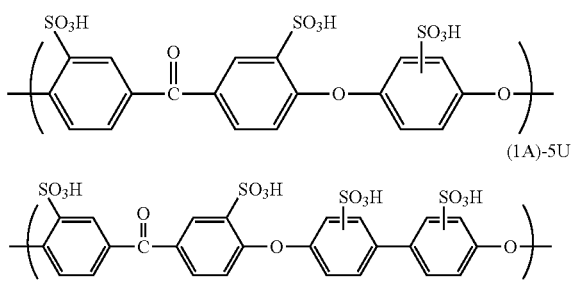

(1A)-4U
(1A)-5U

In the structural unit represented by 1A)-4U, the compositional formula of elements constituted is $C_{19}H_{12}O_{12}S_3$ and the molar mass is 528.5 (g). Since 1A)-4U has three ion exchange groups (sulfonic acid group), the equivalent number of ion exchange group is 3000 milliequivalents (3000 meq). The ion exchange group density is an equivalent number of ion exchange group per unit weight, namely corresponds to a value obtained by dividing the equivalent number of ion exchange group by the molar mass in the structural unit and is 3000÷528.5 =5.7 (meq/g). Similarly, in the structural unit represented by (1A)-5U, the compositional formula of the element is $C_{25}H_{16}O_{15}S_4$ and the molar mass is 684.7. Since the structural unit represented by (1A)-5U has four ion exchange groups, the ion exchange group density is 4000÷684.7=5.8 (meq/g).

Thus, the ion exchange group density of segment having an ion exchange group can be determined from the structural unit constituting the segment having an ion exchange group.

Further, in the segment having an ion exchange group, the repeatring number m of the structural unit is 5 or more, preferably a range of 5 to 1000, further preferably a range of 10 to 1000 and particularly preferably a range of 20 to 500. When the value m is 5 or more, it is preferable because the proton conductivity is adequate as the polymer electrolyte for fuel cells. When the value m is 1000 or less, it is preferable because the production of the segments is easier.

In order to make the value m 5 or more thus, a hydrophilic polymer in which the molecular weight represented by weight average molecular weight converted to polystyrene by gel permeation chromatography (hereinafter, called as the "GPC method") is usually 5000 or more is used as the segment precursor (hydrophilic polymer) providing the segment having an ion exchange group, at the production stage of the block copolymer.

Then, the segment having substantially no ion exchange group that are other essential segment according to the block copolymer of the invention are illustrated.

The segment having substantially no ion exchange group is the segment represented by the above-mentioned general formula (2).

The segment "having substantially no ion exchange groups" is that in which the content of the ion exchange group per the structural unit constituting the segment is 0.1 or less in average. It is preferable that the ion exchange group per the structural unit is zero, namely the segment containing no ion exchange group is preferable.

Hereat, $Ar^4$ and $Ar^5$ in the general formula (2) each independently represent divalent aromatic groups, and its typical example includes divalent monocyclic aromatic groups such as 1,3-phenylene and 1,4-phenylene; divalent condensed ring aromatic groups such as 1,3-naphthalenediyl, 1,4-naphthalenediyl, 1,5-naphthalenediyl, 1,6-naphthalenediyl, 1,7- naphthalenediyl, 2,6-naphthalenediyl and 2.7-naphthalenediyl; divalent biphenylene groups such as 3,3'0-biphenylene, 3,4+-biphenylene and 4,4'-biphenylene, and the like.

These divalent aromatic groups may have a hydrocarbon group having 1 to 20 carbon atoms which may have a substituent, an alkoxy group having 1 to 20 carbon atoms which may have a substituent, an acyl group having 1 to 20 carbon atoms which may have a substituent, an aryloxy group having 6 to 20 carbon atoms which may have a substituent, an aryl carbonyl group having 6 to 20 carbon atoms which may have a substituent or. a fluoto group. Specific examples of the hydrocarbon group, alkoxy group, acyl group, aryloxy group and aryl carbonyl group include those similar as those exemplified as the substituents in the above-mentioned $Ar^1$, $Ar^2$, $Ar^{3a}$ and $Ar^{3b}$.

Among these, those not substituted, namely those having no substituent or those substituted with a fluoro group are preferable as $Ar^4$ and $Ar^5$.

The typical example of the segments have substantially no ion exchange group is a polyethersulfone structure which may have a substituent. Among these, the segments represented by the following general formulae (3)-1 to (3)-18 are preferably used.

(3)-1
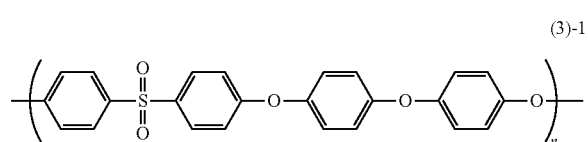

(3)-2
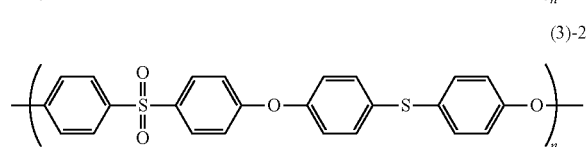

(3)-3
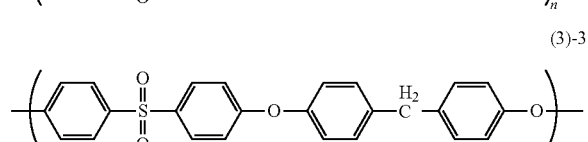

(3)-4
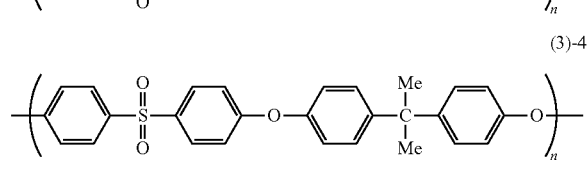

(3)-5
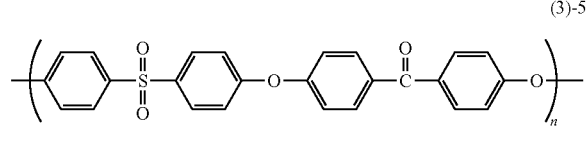

(3)-6
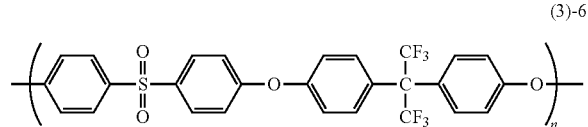

(3)-7
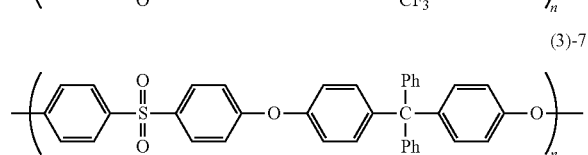

-continued (3)-8
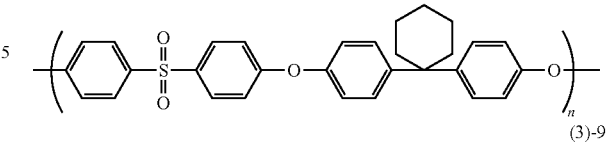

(3)-9
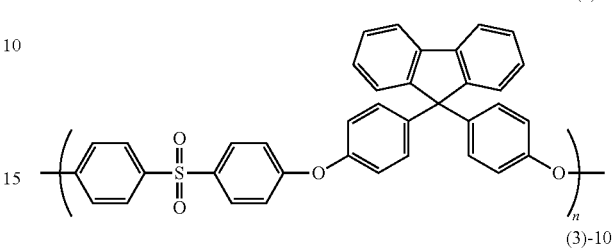

(3)-10
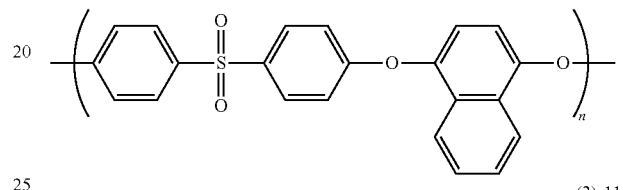

(3)-11
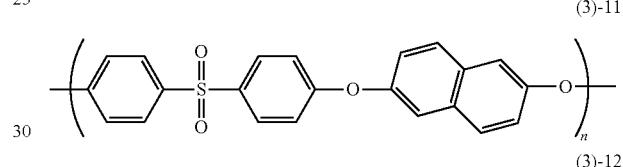

(3)-12
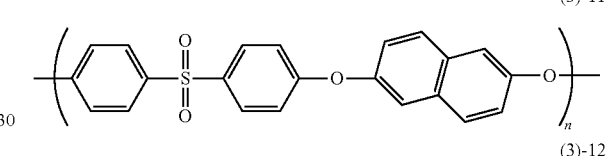

(3)-13
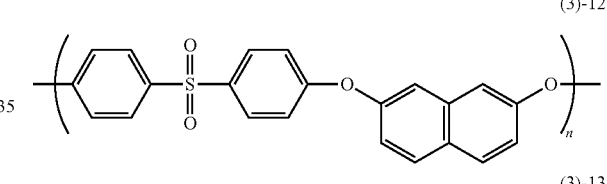

(3)-14
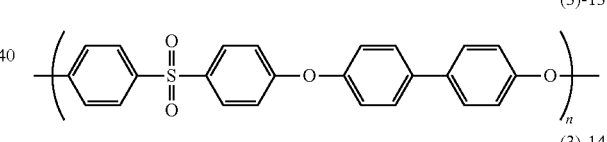

(3)-15
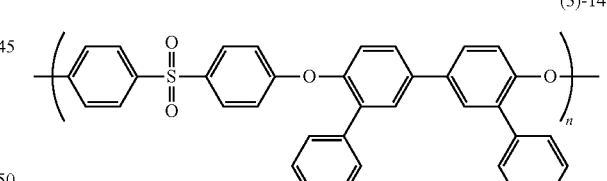

(3)-16
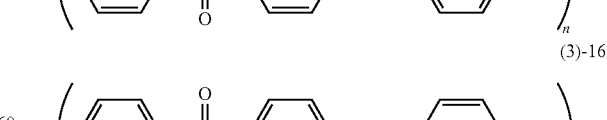
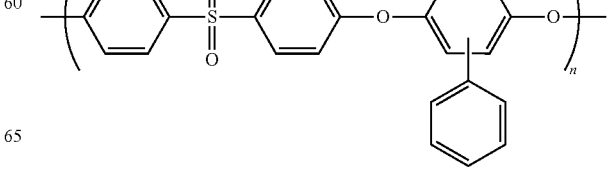

-continued

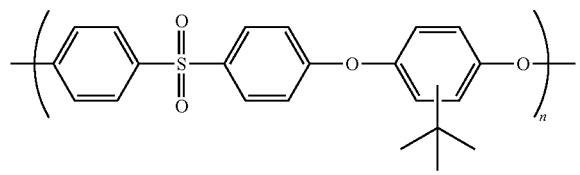

In the formulae, n represents the same meaning as above.

Further, in the segments having substantially no ion exchange group, structural unit of polymerization n is 5 or more preferably a range of 5 to 1000, further preferably a range of 10 to 1000 and particularly preferably a range of 20 to 500. When the value n is 5 or more, it is preferable because water resistance is adequate as the polymer electrolyte for fuel cells. When the value m is 1000 or less, it is preferable because the production of the segment is easier.

In order to make the value n 5 or more thus, a hydrophobic polymer in which the molecular weight represented by weight average molecular weight converted to polystyrene by the GPC method is usually 5000 or more is used as segment precursor (hydrophobic polymer) providing the segment having substantially no ion exchange group at the production stage of. the block copolymer.

The block copolymer of the invention has the segment represented by the general formula 1A), (1B) or (1C) as the segment having an ion exchange group and the segment represented by the general formula (2) as the segments having substantially no ion exchange group. Preferable typical examples thereof are, for example, as follows.

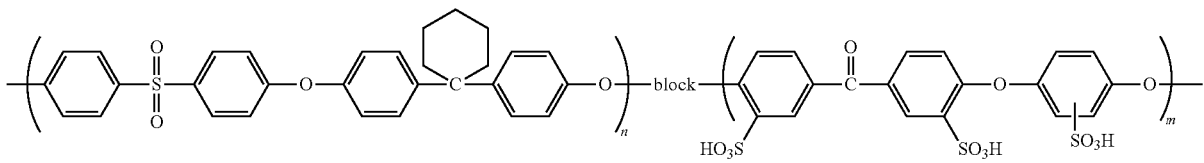

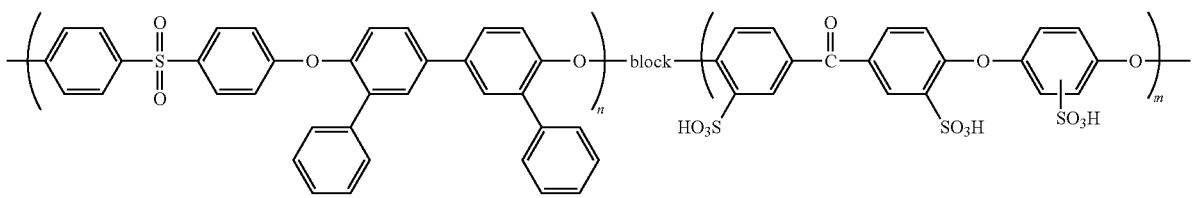

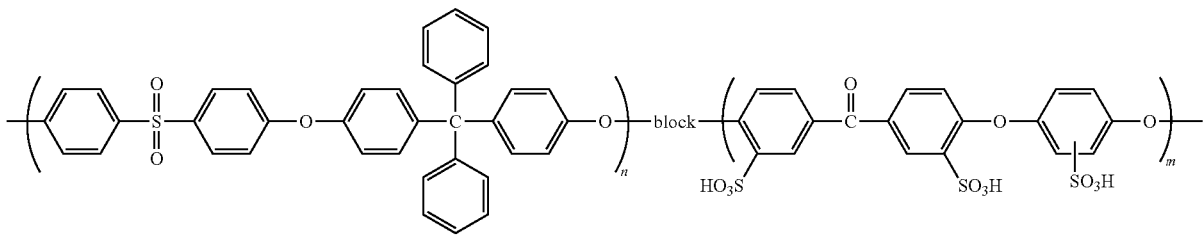

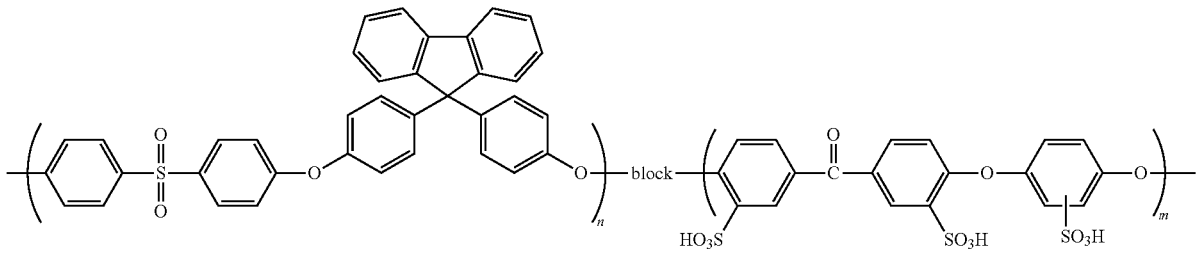

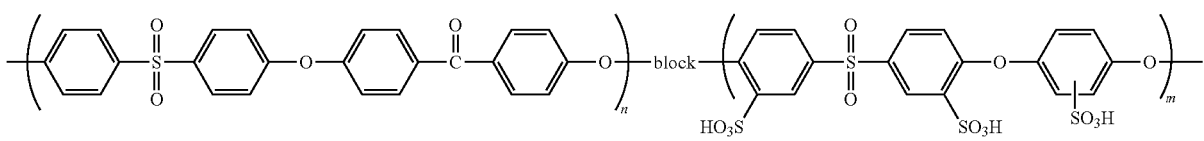

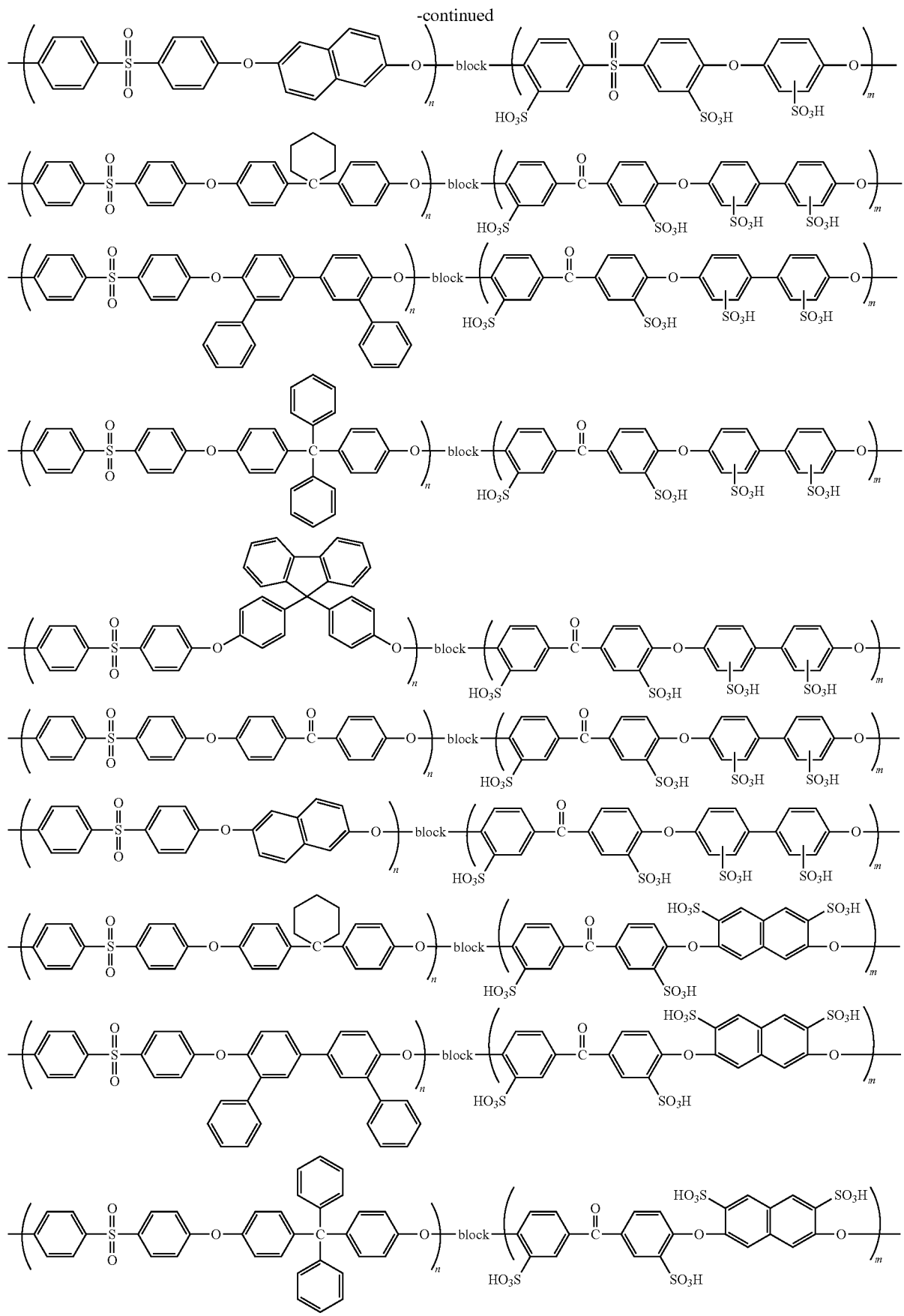

-continued

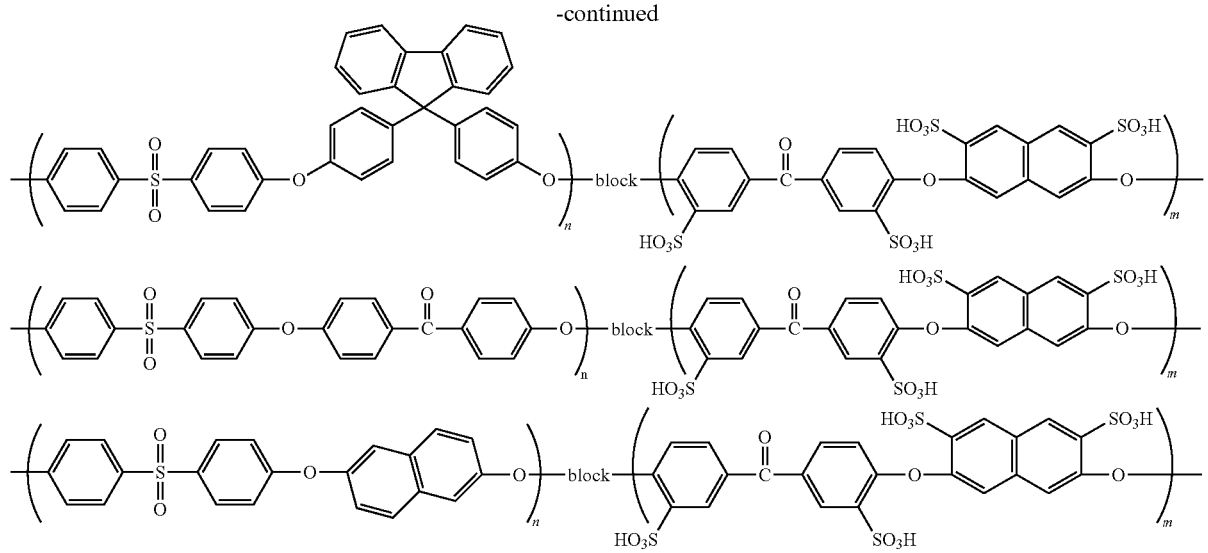

Further, the block copolymners exemplified above are represented by 2 segments being the essential segments, and may be a block copolymer having a plural number of the segments and may contain segments other than these segments.

Then, the production process of block copolymer according to the invention is illustrated. Examples of the production process include the followings:

I. a process in which the precursor (hereinafter, called as the "hydrophilic polymer") of the segment having an ion exchange group is produced using a monomer having an ion exchange group that induces the segment represented by the general formula (1A), (1B) or (1C), on the other hand, the precursor (hereinafter, called as the "hydrophobic polymer") of the segment substantially having no ion exchange group is produced using a monomer having no ion exchange group that induces the segment represented by the general formula (2), and then the hydrophilic polymer and the hydrophobic polymer are coupled to produce the block copolymer;

II. a process in which the hydrophilic polymer is produced in the same manner as in the process shown in the above-mentioned I, and then, the hydrophilic polymer is polymerized with a monomer having no ion exchange group that induces the segment represented by the general formula (2) to produce the block copolymer;

III. a process in which the hydrophobic polymer is produced in the same manner as in the process shown In the above-mentioned I, and then, the hydrophobic polymer is polymerized with a monomer having an ion exchange group that induces the ,segment represented by the general formula (1) to produce the block copolymer; and IV. a process in which the block copolymer is produced by combining the above-mentioned I and II or II and III, and the like.

Hereat, the block copolymer in the production process of I obtained by coupling the hydrophilic polymer with the hydrophobic polymer can be formed by that when one of respective polymers that can form segments is a segment precursor having hydroxyl groups at both terminals, a segment precursor having halogen groups at both terminals is used as other segment precursor, both segment precursors are coupled by the condensation reaction of the hydroxyl group with the halogen group. Further, the block copolymer can be also similarly formed by the condensation of mutual polymers that can form the segments and have hydroxyl group at one terminal and halogen group at another terminal. Hereat, the hydroxyl group may be converted to an alcoholate by alkali.

Further, when the hydrophilic polymer is coupled with the hydrophobic polymer, a compound having a reactive group that reacts with the terminal groups of both segments may be used as a coupler. Specifically, when the above-mentioned both polymers have hydroxyl groups as the terminal groups, a compound having a plurality of halogen groups in a molecule can be used as the coupler. Examples of the compound having a plurality of halogen groups in a molecule include decafluoroblphenyl, hexafluorobenzene, 4,4'-difluorobenzophenone, 4,4'-difluorodiphenylsulfone and the like. Similarly, when both polymers have halogen groups as the terminal groups, a compound having a plurality of hydroxyl groups in a molecule may be used as the coupler. Examples of the compound having a plurality of hydroxyl groups in a molecule include 4,4'-dihydroxybiphenyl, bisphenol A, 4,4'-dihydroxybenzophenone, 4,4'-dihydroxydiphenylsulfone and the like.

Hereat, when the block copolymer is produced using the coupler as describe above, the block copolymer having a branched structure can be also produced by controlling the reaction condition when multifunctional couplers such as decafluorobiphenyl and hexafluorobenzene are used.

At that time, the block copolymer having a linear chain structure and the block copolymer having a branched structure can be separately prepared by changing the feed composition of the hydrophilic polymer and the hydrophobic polymer.

Then, the production process of the above-mentioned II is illustrated.

As the production process, for example, when the hydrophilic polymer is a polymer having hydroxyl groups at both terminals or a polymer having halogen groups at both terminals, the block copolymer can be obtained by polymerization using a monomer having two hydroxyl groups at both terminals and a monomer having two halogen groups at both terminals as a monomer having no ion exchange group. Similarly, when the hydrophilic polymer is a polymer having a hydroxyl group at one terminal and having a halogen group at another terminal, the block copolymer can be also obtained by polymerization with a monomer having one hydroxyl group at one terminal, having one halogen group at another terminal and having no ion exchange group.

These production processes can be easily performed based on condensation reaction of the hydroxyl groups and the halogen groups.

The block copolymer of the invention is produced by any one of the production processes as described above. In the production process of the above-mentioned I or II, the monomer producing the hydrophilic polymer can be selected considering the structural unit of the polymer obtained, so that the ion exchange group density of the hydrophilic polymer is 4.0 meg or more. Similarly in the production process of the above-mentioned III, the monomer can be selected considering the structural unit of the polymer induced by the monomer having an ion exchange group copolymerized with the hydrophobic polymer.

The weight composition ratio of the segments having an ion exchange group to the segments having substantially no ion exchange group can be easily controlled by the weight ratio of the hydrophilic polymer to the hydrophobic polymer in case of the production process of I, by the weight ratio of the hydrophilic polymer to the weight of the monomer inducing the segments having substantially no ion exchange group in case of the production process of II, and by the weight ratio of the hydrophobic polymer to the weight of the monomer inducing the segmentshavinganionexchangegroup. Thustheblockcopolymer with a preferable weight composition ratio can be obtained.

Thus, the block copolymer of the invention is obtained, and the content of the ion exchange group as the whole block copolymer is preferably 0.1 meg to 4.0 meq of the ion exchange group equivalent per 1 g of the polymer electrolyte being the block copolymer (ion exchange capacity: 0. 1 meq/g to 4.0 meq/g), particularly preferably 0.8 meq/g to 3.0 meq/g represented by the ion exchange capacity and specifically preferably 1.3 meq/g to 2.5 meq/g. When the content of the ion exchange group represented by the ion exchange capacity is within the above-mentioned range, it is preferable because the proton conductivity and water resistance are satisfied at a higher level.

The average molecular weight of the block copolymer of the invention is preferably 5000 to 1000000 represented by the weight average molecular weight converted to polystyrene and particularly preferably 20000 to 500000.

The average molecular weight of the segment having an ion exchange group is usually 5000 or more represented by the weight average molecular weight converted to polystyrene as described above, preferably 5000 to 200000 and particularly preferably 10000 to 100000.

On the other hand; the average molecular weight of the segment having substantially no ion exchange group is usually 5000 or more represented by the weight average molecular weight converted to polystyrene as described above, preferably 5000 to 200000 and particularly preferably 10000 to 100000.

Further, the block copolymer of the invention has respectively one or more segments having an ion exchange group and one or more segments having substantially no ion exchange group, but a case of having 2 or more of either of the segments and a case of so-called multiblock such as a case of having 2 or more of both segments respectively are particularly preferable.

Then, a case of using the block copolymer of the invention as a barrier membrane of electrochemical devices such as fuel cells is illustrated.

In this case, the block copolymer of the Invention is usually used in the mode of a film, but a method of converting it to a film is not specifically limited and, for example, a method of preparing a film from solution state (solution cast process) is preferably used.

Specifically, a film is prepared by dissolving the block copolymer in an appropriate solvent, coating the solution on a glass plate by flow casting and removing the solvent. The solvent used for film preparation is not specifically limited so far as it can dissolve the block polymer and can be removed thereafter. There are preferably used aprotic polar solvents such as N,N-dimethylformamide (hereinafter. called as "DMF"), N,N-dimethylacetoamide (hereinafter, called as "DMAc"), N-methyl-2-pyrrolidone (hereinafter, called as "NMP") and dimethylsulfoxide (hereinafter, called as "DMSO"); chlorine solvents such as dichloromethane, chloroform, 1,2-dichloroethane, chlorobenzene and dichlorobenzene; alcohols such as methanol, ethanol and propanol; alkyleneglycol monoalkyl ether such as ethyleneglycol monomethyl ether, ethyleneglycol monoethyl ether, propyleneglycol monomethyl ether and propyleneglycol monoethyl ether; and water. These can be also used alone, but 2 or more of solvents can be also used in mixture if necessary. Among these, DMSO, DMf, DMAc, NMP and the like are preferable because the solubility of the block copolymer is high.

The thickness of the film is not specifically limited but 10 to 300 μm is preferable and 20 to 100 μm is particularly preferable. When the film is thinner than 10 μm, practical strength is not occasionally adequate and when the film is thicker than 300 μm, film resistance tends to enlarged and the property of electrochemical devices tends to be lowered. The film thickness can be controlled by the concentration of solution and coating thickness on a substrate.

Further, in order to improve various physical properties of the film, a plasticizer, a stabilizer, a releasing agent and the like that are used for usual polymers can be added to the block copolymer of the invention. Further, other polymer can be alloyed in complex with the block copolymer of the invention by methods of mixing them in the same solution to be co-cast, etc.

It is also known in use for fuel cells that inorganic or organic fine particles are added as a water-holding agent so as to easily control water. These known methods can be used so far as either of them does not deviate the purpose of the invention. Further, cross-linking can be also carried out by irradiating electron beam, radiation and the like in order to improve the mechanical strength of the film, etc.

Further, a composite film can be prepared by immersing the block copolymer of the invention into a porous substrate to be complexed, in order to further improve the strength, flexibility and durability of a polymer electrolyte membrane. Known methods can be used as the complexation method. The porous substrate is not specifically limited so far as it satisfies the above-mentioned use purpose, and a porous film. woven cloth, fibril and the like are mentioned and can be used irrespective of their shape and material.

When the polymer electrolyte membrane using the block copolymer of the invention is used as a barrier membrane of a polymer electrolyte type fuel cell, the film thickness of the porous substrate is usually 1 to 100 μm, preferably 3 to 30 μm and further preferably 5 to 20 μm. Its pore diameter is usually 0.01 to 100 μm and preferably 0.02 to 10 μm and porosity is 20 to 98% and preferably 40 to 95%.

When the film thickness of the porous substrate is too thin, the effect of strength reinforcement after complexation or reinforcing effect of providing flexibility and durability is inadequate and gas leakage (cross leak) is easily generated. Further, when the film thickness is too thick, electric resistance becomes high and the composite film obtained is inadequate as the barrier membrane of a solid polymer type fuel cell. When the pore diameter is too small, the filling of the solid polymer electrolyte is difficult and when it is too large, reinforcing effect for the solid polymer electrolyte is weak. When the porosity is too small, resistance as the solid polymer electrolyte is large and when it is too large, the strength of the porous substrate itself becomes usually weak and the reinforcing effect is reduced.

An aliphatic polymer, an aromatic polymer or a fluorine-containing polymer is preferable from the viewpoint of heat resistance and considering the reinforcing effect of physical strength.

Finally, the fuel cell of the invention is illustrated. Examples of the fuel cell using a polymer electrolyte include a solid polymer type fuel cell using hydrogen gas as fuel and a direct methanol type solid polymer type fuel cell directly feeding methanol as fuel, but the copolymer of the invention can be preferably used for both fuel cells.

The fuel cell of the invention includes a fuel cell using the copolymer of the invention as the polymer electrolyte membrane and/or the polymer electrolyte composite membrane, a fuel cell using the polymer electrolyte of the invention as the polymer electrolyte in a catalyst layer, and the like.

The fuel cell using the copolymer of the invention as the polymer electrolyte membrane and/or the polymer electrolyte composite membrane can be produced by joining a catalyst and a gas diffusion layer on the both sides of the polymer electrolyte membrane and/or the polymer electrolyte composite membrane. Known materials can be used as the gas diffusion layer, but porous carbon woven cloth, carbon non-woven cloth or carbon paper is preferable because raw material gas is efficiently transported to the catalyst.

Hereat, the catalyst is not specifically limited so far as it can activate the redox reaction of hydrogen or oxygen and known catalysts can be used, but platinum fine particles are preferably used. The platinum fine particles are often used being supported on particulate or fibrous carbon such as active carbon and graphite and preferably used. Further, platinum supported on carbon is mixed with the alcohol solution of a perfluoroalkylsulfonic acid resin as the polymer electrolyte to prepare paste, and the catalyst layer is obtained by coating and drying the paste on the gas diffusion layer and/or polymer electrolyte membrane and/or polymer electrolyte composite membrane. As the specific method, for example, known methods such as the method described in J. Electrochem. Soc.: Electrochemical Science and Technology, 1988, 135 (9), 2209 can be used.

The fuel cell using the copolymer of the invention as the polymer electrolyte in the catalyst layer includes those using the block copolymer of the invention in place of the fore-mentioned perfluoroalkylsulfonic acid resin constituting the catalyst layer. The solvent that can be used at obtaining the catalyst layer using the block copolymer of the invention includes those similar as those mentioned as the solvent that can be used when the film of the block copolymer is prepared. When the catalyst layer using the block copolymer of the invention is used, known polymer electrolyte membranes can be used as the polymer electrolyte membrane, without being limited to the film using the block copolymer of the invention.

EXAMPLES

The invention is illustrated below according to Examples but the invention is not limited at all to these Examples.
Measurement of molecular weight:

The weight average molecular weight (Mw) converted to polystyrene was measured under the conditions below by GPC method (A) or (B).
GPC method (A)
GPC measurement apparatus; HLC-8220 manufactured by TOSOH Corporation.
Column: AT-80M (Registered TradeMark: Sodex) manufactured by SHOWA DENKO Co. Two columns were connected in series.
Column temperature: 40° C.
Moving phase solvent: DMAc (LiBr was added so as to be 10 mmol/dm$^3$.)
GPC method (B)
GPC measurement apparatus HLC-8220 manufactured by TOSOH Corporation.
Column: TSK gel GMHH$_{HR}$-M manufactured by TOSOH Co. One column was connected.
Column temperature: 40° C.
Moving phase solvent: DMAc (LiBr was added so as to be 10 mmol/dm$^3$.)
Flow rate of solvent: 0.5 mL/min. Measurement of proton conductivity:

It was measured under the conditions of a temperature of 80° C. and a relative humidity of 90% by an alternating-current process.
Measurement of ion exchange capacity:
It was determined by a titration method
Measurement of water uptake:
The polymer electrolyte membrane dried was weighed, water uptake was calculated from the increasing amount of membrane weight after immersing it in deionized water at 100° C. for 2 hours and a ratio for the fore-mentioned dry membrane was determined.

Example 1

Production of block copolymer a 4.50 g (9.90 mmol) of dipotassium 4,4'-difluorodiphenylketone-3,3'-disulfonate, 2.71 g (11.88 mmol) of potassium 2,5-dihydroxybenzenesulfonate and 1.71 g (12.36 mmol) of potassium carbonate were added to a flask equipped with an azeotropic distillation apparatus under argon atmosphere, and 30 mL of DMSO and 30 mL of toluene were added. Toluene was distilled at a bath temperature of 150° C., and thus azeotropic dehydration of moisture In the system was performed. Subsequently, the resultant solution was stirred for 4 hours while keeping warm, to obtain a hydrophilic polymer. The weight average molecular weight of the obtained hydrophilic polymer determined by the GPC method (A) was 22000 and the ion exchange group density calculated from its structural unit was 5.7 meq/g.

Further separately, 3.94 g (18.06 mmol) of 4,4'-dihydroxybenzophenone, 5.04 g (20.14 mmol) of 4.4'-difluorodiphenylsulfone and 2.60 g (18.78 mmol) of potassium carbonate were added to a flask equipped with an azeotropic distillation apparatus under argon atmosphere, and 45 mL of DMSO and 30 mL of toluene were added. Toluene was distilled at a bath temperature of 120° C., and thus azeotropic dehydration of moisture in the system was performed. Subsequently, the resultant solution was stirred for 6 hours while keeping warm, to obtain a hydrophobic polymer. The weight average molecular weight of the obtained hydrophobic polymer determined by the GPC method (A) was 39000.

Successively, after the reaction solution was adequately cooled to room temperature, the reaction solution of the hydrophilic polymer was added dropwise to the reaction solution of the hydrophobic polymer, the reaction mass of the hydrophilic polymer was adequately washed with 20 mL of DMSO to be fed and then, the reaction solution was stirred at an inner temperature of 130° C. for 20 hours while keeping warm. The reaction solution was cooled. and then was added dropwise to a large quantity of aqueous hydrochloric acid and the precipitate prepared was collected by filtration. Further, washing with water and filtration were repeated until washing becomes neutral, and then the washed precipitate was washed with hot water at 80° C., and dried at 80° C. at normal pressure to obtain 12.05 g of a block copolymer a having a structure shown in under-description. The weight average molecular weight of the obtained block copolymer determined by the GPC method (A) was 122000.

The film of the block copolymer a obtained was prepared as below. After 2.0 g of the polymer obtained was dissolved in 8.0 g of NMP, the solution was filtered to obtain a solution with a concentration of 20% by weight. Then, the solution was applied to a glass substrate by flow casting and NMP was removed over about 5 hours at 80° C. in an oven. Then, a step of treating the substrate for one hour with 2N hydrochloric acid was repeated twice and was further washed with flowing water for 8 hours to obtain a polymer electrolyte membrane with a film thickness of 39 μm.

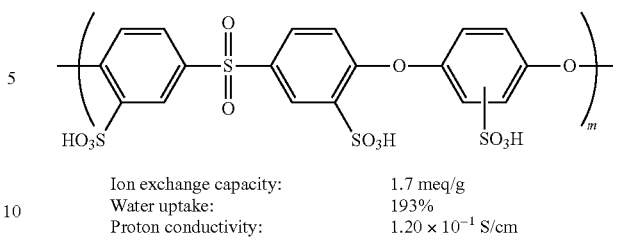

| Ion exchange capacity: | 1.7 meq/g |
| Water uptake: | 193% |
| Proton conductivity: | $1.20 \times 10^{-1}$ S/cm |

Example 2

Production of block copolymer c 4.78 g (10.51 mmol) of dipotassium 4,4'-difluorodiphenylketone-3,3'-disulfonate, 2.00 g (8.76 mmol) of potassium 2.5-dihydroxybenzenesulfonate and 1.51 g (10.93 mmol) of potassium carbonate were added to a flask equipped with an azeotropic distillation apparatus under argon atmosphere, and 30 mL of DMSO and 30 mL of toluene were added. Toluene was distilled for 2 hours at a bath temperature of 150° C., and thus azeotropic dehydration of moisture in the system

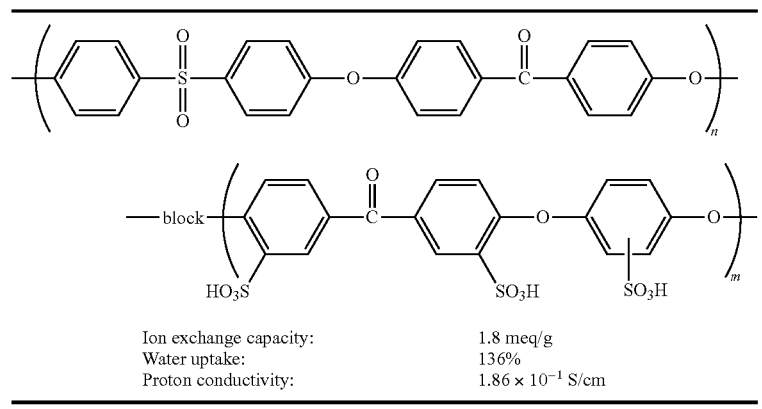

| Ion exchange capacity: | 1.8 meq/g |
| Water uptake: | 136% |
| Proton conductivity: | $1.86 \times 10^{-1}$ S/cm |

Comparative Example 1

Production of block copolymer b

A block copolymer b having a structure shown below was produced in accordance with Japanese Unexamined Patent Publication No. 2005-126684, Example 5. The ion exchange group density calculated from the structural unit at the hydrophilic polymer stage was 5.3 meq/g. The film preparation method of the polymer electrolyte membrane was carried out according to Example 1.

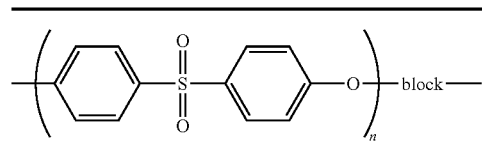

was performed. Subsequently, the resultant solution was stirred for 4 hours while keeping warm, to obtain a hydrophilic polymer. The weight average molecular weight of the obtained hydrophilic polymer determined by the GPC method (A) was 42000 and the ion exchange group density calculated from its structural unit was 5.7 meq/g.

Further separately, 6.12 g (18.09 mmol) of 4,4'-dihydroxy-3.3'-dlphenylbiphenyl, 4.15 g (16.31 mmol) of 4.4'-difluorodiphenylsulfone and 2.60 g (18.81 mmol) of potassium carbonate were added to a flask equipped with an azeotropic distillation apparatus under argon atmosphere, and 45 mL of DMSO and 30 mL of toluene were added. Toluene was distilled at a bath temperature of 150° C., and thus azeotropic dehydration of moisture in the system was performed. Subsequently. the resultant solution was stirred for 8 hours while keeping warm, to obtain a hydrophobic polymer. The weight average molecular weight of the obtained hydrophobic polymer determined by the GPC method (A) was 24000.

Successively, after the reaction solution was adequately cooled to room temperature, the reaction solution of the hydrophilic polymer was added dropwise to the reaction solution of the hydrophobic polymer, the reaction mass of the hydrophilic polymer was adequately washed with 20 mL of DMSO to be fed and then, the reaction solution was stirred at an inner temperature of 150° C. for 6 hours while keeping warm. The reaction solution was cooled, and then was added dropwise to a large quantity of aqueous hydrochloric acid and the precipitate prepared was collected by filtration. Further, washing with water and filtration were repeated until washing becomes neutral, and then the washed precipitate was washed with hot water at 80° C. and dried at 80° C. at normal pressure to obtain 13.71 g of a block copolymer c having a structure shown in under-description. The weight average molecular weight of the obtained block copolymer determined by the GPC method (A) was 175000.

The film preparation method of the polymer electrolyte membrane was carried out in accordance with Example 1.

Further separately, 6.43 g (19.00 mmol) of 4,4'-dihydroxy-3,3'-diphenylbiphenyl, 4.34 g (17.21 mmol) of 4,4'-difluorodtphenylsulfone and 2.73 g (19.76 mmol) of potassium carbonate were added to a flask equipped with an azeotropic distillation apparatus under argon atmosphere, and 47 mL of DMSO and 35 mL of toluene were added. Toluene was distilled for 2 hours at a bath temperature of 150° C., and thus azeotropic dehydration of moisture in the system was performed. Subsequently, the resultant solution was stirred for 4 hours while keeping warm, to obtain a hydrophobic polymer . The weight average molecular weight of the obtained hydrophobic polymer determined by the GPC method (A) was 23000.

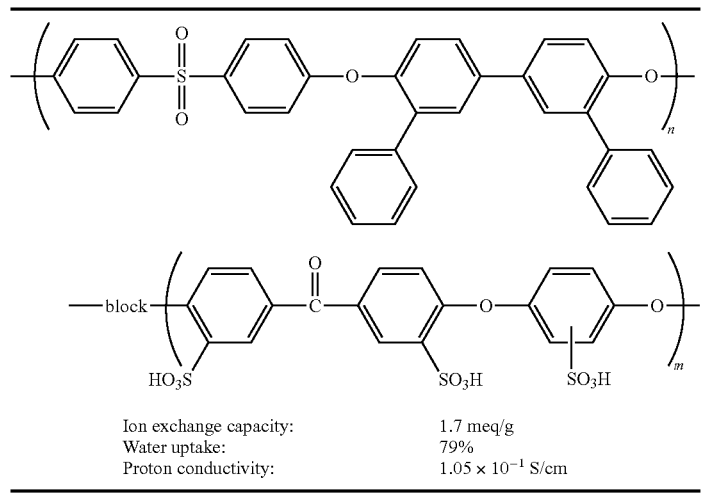

| Ion exchange capacity: | 1.7 meq/g |
| Water uptake: | 79% |
| Proton conductivity: | $1.05 \times 10^{-1}$ S/cm |

Comparative Example 2

Production of block copolymer d 5.16 g (10.51 mmol) of dipotassium 4,4'-difluorodiphenylsulfone-3,3'-disulfonate, 2.00 g (8.76 mmol) of potassium 2,5-dihydroxybenzenesulfonate and 1.51 g (10.93 mmol) of potassium carbonate were added to a flask equipped with an azeotropic distillation apparatus under argon atmosphere, and 30 mL of DMSO and 30 mL of toluene were added. Toluene was distilled for 2 hours at a bath temperature of 150° C., and thus azeotropic dehydration of moisture in the system was performed. Subsequently, the resultant solution was stirred for 4 hours while keeping warm, to obtain a hydrophilic polymer. The weight average molecular weight of the obtained hydrophilic polymer determined by the GPC method (A) was 56000 and the ion exchange group density calculated from its structural unit was 5.3 meq/g.

Successively, after the reaction solution was adequately cooled to room temperature, the reaction solution of the hydrophilic polymer was added dropwise in the reaction solution of the hydrophobic polymer, the reaction mass of the hydrophilic polymer was adequately washed with 20 mL of DMSO to be fed and then, the reaction solution was stirred at an inner temperature of 150° C. for 15 hours while keeping warm. The reaction solution was cooled, and then was added dropwise to a large quantity of aqueous hydrochloric acid and the precipitate prepared was collected by filtration. Further, washing with water and filtration were repeated until washing becomes neutral, the washed precipitate was washed with hot water at 80° C. and then dried at 80° C. at normal pressure to obtain 14.98 g of the block copolymer d having a structure shown in under-description. The weight average molecular weight of the obtained block copolymer determined by the GPC method (A) was 274000.

The film preparation method to the polymer electrolyte membrane was carried out in accordance with Example 1.

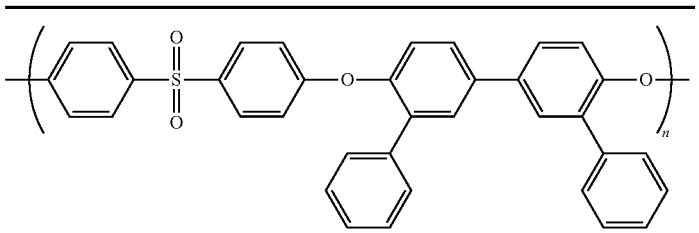

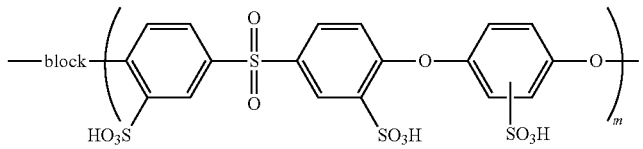

| Ion exchange capacity: | 1.7 meq/g |
| Water uptake: | 98% |
| Proton conductivity: | $1.04 \times 10^{-1}$ S/cm |

Example 3

Production of block copolymer e 5.97 g (13.14 mmol) of dipotassium 4,4'-difluorodiphenylketone-3,3'-disulfonate, 2.50 g (10.95 mmol) of potassium 2,5-dihydroxybenzenesulfonate and 1.59 g (11.50 mmol) of potassium carbonate were added to a flask equipped with an azeotropic distillation apparatus under argon atmosphere, and 38 mL of DMSO and 40 mL of toluene were added. Toluene was distilled for 2 hours at a bath temperature of 150° C., and thus azeotropic dehydration of moisture in the system was performed. Subsequently, the resultant solution was stirred for 4 hours while keeping warm, to obtain a hydrophilic polymer. The weight average molecular weight of the obtained hydrophilic polymer determined by the GPC method (A) was 38000 and the ion exchange group density calculated from its structural unit was 5.7 meq/g.

Further separately, 4.10 g (25.58 mmol) of 2,6-dihydroxynaphthalene, 5.95 g (23.39 mmol) of 4,4'-difluorodiphenylsulfone and 3.89g (28.14 mmol) of potassium carbonate were added to a flask equipped with an azeotropic distillation apparatus under argon atmosphere, and 91 mL of DMSO and 40 mL of toluene were added. Toluene was distilled at a bath temperature of 150° C., and thus azeotropic dehydration of moisture in the system was performed. Subsequently, the resultant solution was stirred for 3 hours while keeping warm, to obtain a hydrophobic polymer. The weight average molecular weight of the obtained hydrophobic polymer determined by the GPC method (A) was 27000.

Successively, after the reaction solution was adequately cooled to room temperature, the reaction solution of the hydrophilic polymer was added dropwise to the reaction solution of the hydrophobic polymer, the reaction mass of the hydrophilic polymer was adequately washed with 20 mL of DMSO to be fed and then, it was stirred at an inner temperature of 150° C. for 12 hours while keeping warm. The reaction solution was cooled, and then was added dropwise to a large quantity of aqueous hydrochloric acid and the precipitate prepared was collected by filtration. Further, washing with water and filtration were repeated until washing becomes neutral, and then the washed precipitate was washed with hot water at 80° C. and dried at 80° C. at normal pressure to obtain 13.82 g of a block copolymer e having a structure shown in under-description. The weight average molecular weight of the obtained block copolymer determined by the GPC method (A) was 131000.

The film preparation method of the polymer electrolyte membrane was carried out in accordance with Example 1.

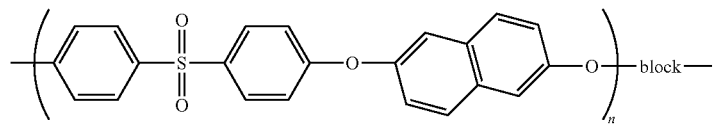

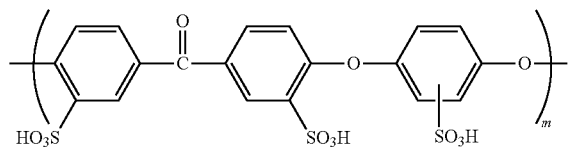

| Ion exchange capacity: | 2.0 meq/g |
| Water uptake: | 106% |
| Proton conductivity: | $1.74 \times 10^{-1}$ S/cm |

Comparative Example 3

Production of block copolymer f

A block copolymer f having a structure shown below was produced in accordance with Japanese Unexamined Patent Publication No. 2005-139432, Example 2. The ion exchange group density calculated from the structural unit of the hydrophilic polymer was 5.3 meq/g. The film preparation method of the polymer electrolyte membrane was carried out according to Example 1.

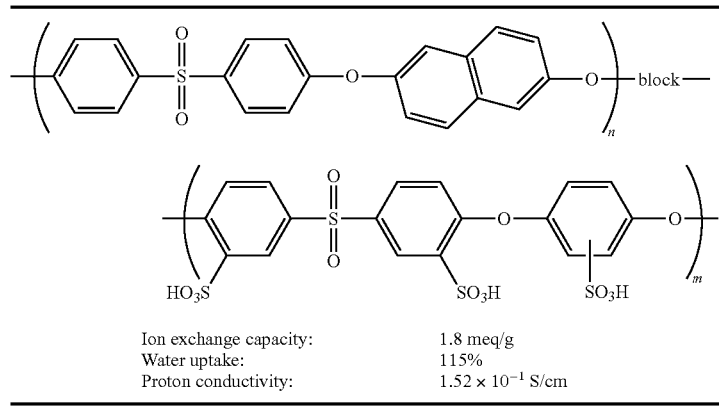

Ion exchange capacity: 1.8 meq/g
Water uptake: 115%
Proton conductivity: 1.52 × 10⁻¹ S/cm

Example 4

Production of block copolymer g 6.81 g (14.98 mmol) of dipotassium 4,4'-difluorodiphenylketone-3,3'-dilsulfonate, 2.00 g (12.49 mmol) of 2,6-dl-hydroxynaphthalene and 1.81 g (13.11 mmol) of potassium carbonate were added to a flask equipped with an azeotropic distillation apparatus under argon atmosphere, and 36 mL of DMSO and 35 mL of toluene were added. Toluene was distilled for 3 hours at a bath temperature of 165° C., and thus azeotropic dehydration of moisture in the system was performed. Subsequently, the resultant solution was stirred for 8 hours while keeping warm, to obtain a hydrophilic polymer. The ion exchange group density calculated from its structural unit was 4.0 meq/g.

Further separately, 7.39 g (21.83 mmol) of 4,4'-dihydroxy-3,3'-diphenylbiphenyl, 4.91 g (19.33 mmol) of 4,4'-difluorodiphenylsulfone and 3.32 g (24.01 mmol) of potassium carbonate were added to a flask equipped with an azeotropic distillation apparatus under argon atmosphere, and 63 mL of DMSO and 40 mL of toluene were added. Toluene was distilled for 3 hours at a bath temperature of 165° C., and thus azeotropic dehydration of moisture in the system was performed. Subsequently, the resultant solution was stirred for 8 hours while keeping warm, to obtain a hydrophobic polymer. The weight average molecular weight of the obtained hydrophobic polymer determined by the GPC method (B) was 10000.

Successively, after the reaction solution was adequately cooled to room temperature, the reaction solution of the hydrophobic polymer was added dropwise to the reaction solution of the hydrophilic polymer, the reaction mass of the hydrophobic polymer was adequately washed with 20 mL of DMSO to be fed and then, the reaction solution was stirred at an inner temperature of 150° C. for 10 hours while keeping warm. The reaction solution was cooled, and then was added dropwise to a large quantity of aqueous hydrochloric acid and the precipitate prepared was collected by filtration. Further, washing with water and filtration were repeated until washing becomes neutral, and then the washed precipitate was washed with hot water at 80° C. and dried at 80° C. at normal pressure to obtain 17.84 g of a block copolymer g having a structure shown in under-description. The weight average molecular weight of the obtained block copolymer determined by the GPC method (B) was 135000.

The film preparation method of the polymer electrolyte membrane was carried out in accordance with Example 1.

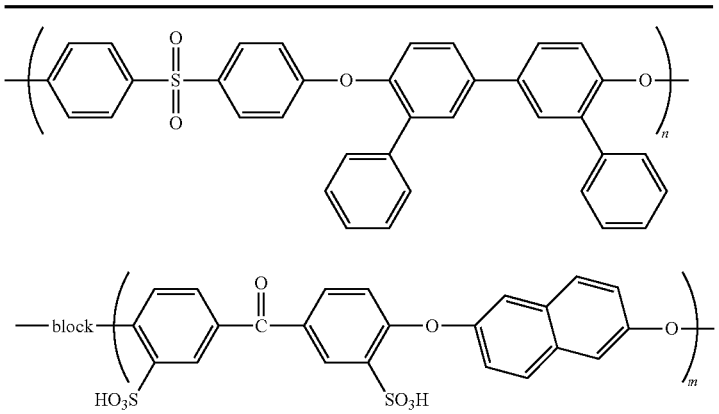

Ion exchange capacity: 1.5 meq/g
Water uptake: 53%
Proton conductivity: 0.46 × 10⁻¹ S/cm

Comparative Example 4

Production of block copolymer h 141.84 g (289.14 mmol) of dipotassium 4,4'-difluorodiphenylsulfone-3,3'-disulfonate, 55.00 g (240.95 mmol) of potassium 2,5-dihydroxybenzenesulfonate and 34.97 g (253.00 mmol) of potassium carbonate were added to a flask equipped with an azeotropic distillation apparatus under argon atmosphere, and 790 mL of DMSO and 158 mL of toluene were added. Toluene was distilled for 5 hours at a bath temperature of 150° C., and thus azeotropic dehydration of moisture in the system was performed. Subsequently, the resultant solution was stirred for 12 hours while keeping warm. to obtain a hydrophilic polymer. The weight average molecular weight of the obtained hydrophilic polymer determined by the GPC method (A) was 35000 and the ion exchange group density calculated from its structural unit was 5.3 meq/g.

Further separately, 109.46 g (683.39 mmol) of 2,6-dihydroxynaphthalene, 161.5 g (254.25 mmol) of 4,4'-difluorodiphenylsulfone and 103.90 g (138.21 mmol) of potassium carbonate were added to a flask equipped with an azeotropic distillation apparatus under argon atmosphere, and 1195 mL of DMSO and 190 mL of toluene were added. Toluene was distilled for 5 hours at a bath temperature of 150° C., and thus azeotropic dehydration of moisture in the system was performed. Subsequently, the resultant solution was stirred for 1 hours while keeping warm, to obtain a hydrophobic polymer, The weight average molecular weight of the obtained hydrophobic polymer determined by the GPC method (A) was 36000.

Successively, after the reaction solution was adequately cooled to room temperature, the reaction solution of the hydrophilic copolymer was added dropwise to the reaction solution of the hydrophobic polymer, the reaction mass of the hydrophilic polymer was adequately washed with 30 mL of DMS0 to be fed and then, the reaction solution was stirred at an inner temperature of 140° C. for 2 hours and then 120° C. for 1 hour while keeping warm. The reaction solution was cooled to 100° C., and then was added dropwise to a large quantity of aqueous hydrochloric acid and the precipitate prepared was collected by filtration. Further, washing with water and filtration were repeated until washing becomes neutral, and then the washed precipitate was washed with hot water at 90° C. and dried at 80° C. at normal pressure to obtain a block copolymer h having a structure shown in under-description. The weight average molecular weight of the obtained block copolymer determined by the GPC method (A) was 176000.

The film preparation method of the polymer electrolyte membrane was carried out in accordance with Example 1.

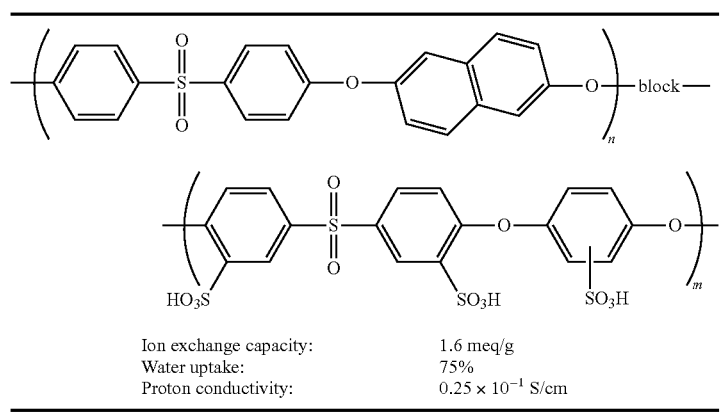

Ion exchange capacity: 1.6 meq/g
Water uptake: 75%
Proton conductivity: $0.25 \times 10^{-1}$ S/cm

Comparative Example 5

Production of block copolymer i 8.10 g (17.80 mmol) of dipotasslum 4,4'-difluorodiphenyketone-3,3'-disulfonate, 3.00 g (14.84 mmol) of 4,4'-dihydroxydlphenylether and 2.15 g (15.58 mmol) of potassium carbonate were added to a flask equipped with an azeotropic distillation apparatus under argon atmosphere, and 46 mL of DMSO and 35 mL of toluene were added. Toluene was distilled for 9 hours at a bath temperature of 165° C., and thus azeotropic dehydration of moisture In the system was performed. Subsequently, the resultant solution was stirred for 5 hours while keeping warm, to obtain a hydrophilic polymer . The weight average molecular weight of the obtained hydrophilic polymer determined by the GPC method (B) was 34000 and the ion exchange group density calculated from its structural unit was 3.7 meq/g.

Further separately, 3.79 g (11.19 mmol) of 4,4'-dihydroxy-3.3'-diphenylbiphenyl, 2.09 g (8.22 mmol) of 4,4'-difluorodiphenylsulfone and 1.70 g (12.31 mmol) of potassium carbonate were added to a flask equipped with an azeotropic distillation apparatus under argon atmosphere, and 30 mL of DMSO and 35 mL of toluene were added. Toluene was distilled for 9 hours at a bath temperature of 165° C., and thus azeotropic dehydration of moisture in the system was performed. Subsequently, the resultant solution was stirred for 12 hours while keeplng warm, to obtain a hydrophobic polymer. The weight average molecular weight of the obtained hydrophobic polymer determined by the GPC method (B) was 5000.

Successively, after the reaction solution was adequately cooled to room temperature, the reaction solution of the hydrophilic polymer was added dropwise to the reaction solution of the hydrophobic polymer. the reaction mass of the hydrophilic polymer was adequately washed with 20 mL of DMSO to be fed and then, the reaction solution was stirred at an inner temperature of 150° C. for 9 hours while keeping warm. The reaction solution was cooled, and then was added dropwise to a large quantity of aqueous hydrochloric acid and the precipitate prepared was collected by filtration. Further, washing with water and filtration were repeated until washing becomes neutral, and then the washed precipitate was washed with hot water at 80° C. and dried at 80° C. at normal pressure to obtain 13.41 g of a block copolymer I having a structure shown in under-description. The weight average molecular weight of the obtained block copolymer determined by the GPC method was (B) 163000.

The film preparation method of the polymer electrolyte membrane was carried out in accordance with Example 1.

temperature of 165° C., and thus azeotropic dehydration of moisture in the system was performed. Subsequently, the resultant solution was stirred for 1.5 hours while keeping warm, to obtain a hydrophobic polymer.

Successively, after the reaction solution was adequately cooled to room temperature, the reaction solution of the hydrophilic polymer was added dropwise to the reaction solution of the hydrophobic polymer, the reaction mass of the

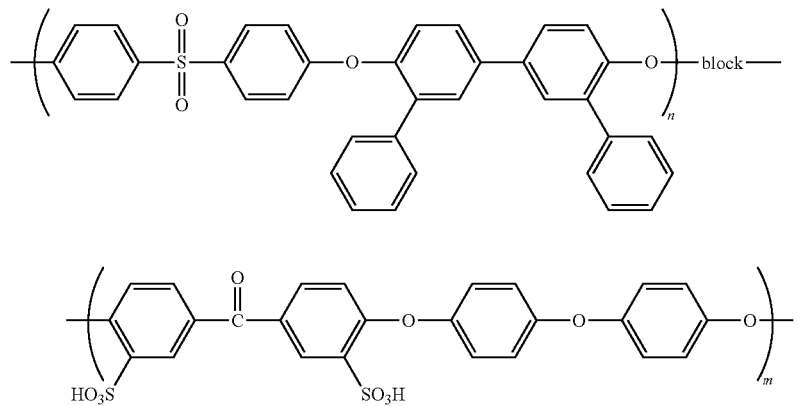

| Ion exchange capacity: | 2.3 meq/g |
| Water uptake: | 255% |
| Proton conductivity: | $1.44 \times 10^{-1}$ S/cm |

Comparative Example 6

Production of block copolymer j 8.10 g (17.80 mmol) of dipotassium 4,4'-difluorodiphenyketone-3,3'-disulfonate, 3.00 g (14.84 mmol) of 4,4'-dihydroxydiphenylether and 2.15 g (15.58 mmol) of potassium carbonate were added to a flask equipped with an azeotropic distillation apparatus under argon atmosphere, and 46 mL of DMSO and 35 mL of toluene were added. Toluene was distilled for 3 hours at a bath temperature of 165° C., and thus azeotropic dehydration of moisture in the system was performed. Subsequently. the resultant solution was stirred for 1.5 hours while keeping warm, to obtain a hydrophilic polymer. The weight average molecular weight of the obtained hydrophilic polymer determined by the GPC method (B) was 27000 and the ion exchange group density calculated from its structural unit was 3.7 meq/g.

Further separately, 3.22 g (16.06 mmol) of bis(4-hydroxy)methane, 2.86 g (13.09 mnol) of 4,4'-difluorodiphenylketone and 2.44 g (17.66 mmol) of potassium carbonate were added to a flask equipped with an azeotropic distillation apparatus under argon atmosphere, and 31 mL of DMSO and 35 mL of toluene were added. Toluene was distilled for 3 hours at a bath hydrophilic polymer was adequately washed with 20 mL of DMSO to be fed and then, the reaction solution was stirred at an inner temperature of 150° C. for 5 hours while keeping warm. The reaction solution was cooled, and then was added dropwise to a large quantity of aqueous hydrochloric acid and the precipitate prepared was collected by filtration. Further, washing with water and filtration were repeated until washing becomes neutral, and then the washed precipitate was washed with hot water at 80° C. and dried at 80° C. at normal pressure to obtain 14.40 g of a block copolymer j having a structure shown in under-description. The weight average molecular weight of the obtained block copolymer determined by the GPC method (B) was 222000.

The film of the block copolymer i obtained was prepared as below. After 2.0 g of the polymer obtained was dissolved in 60.0 g of NMP, the solution was filtered to obtain a solution with a concentration of 3% by weight. Then, the solution was applied into a glass schale by flow casting and NMP was removed over about 5 hours at 80° C. in an oven, Then, a step of treating the substrate for one hour with 2N hydrochloric acid was repeated twice and was further washed with flowing water for 8 hours to obtain a polymer electrolyte membrane with a film thickness of 48 μm.

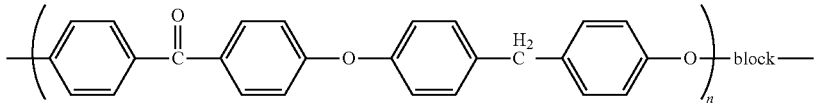

-continued

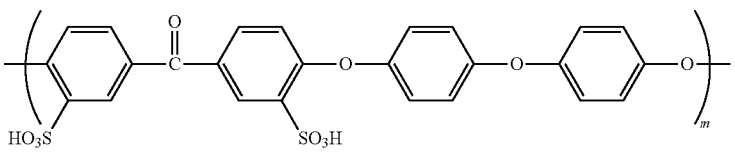

| Ion exchange capacity: | 2.3 meq/g |
| Water uptake: | 370% |
| Proton conductivity: | $2.08 \times 10^{-1}$ S/cm |

What is claimed is:

1. A block copolymer comprising one or more segments having an ion exchange group and one or more segments having substantially no ion exchange group, wherein at least one of the segments having an ion exchange group is the segment represented by the following general formula (1A), (1B) or (1C):

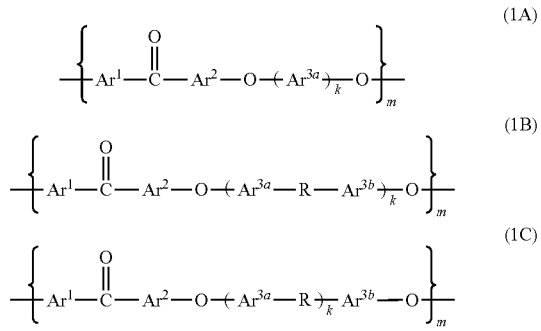

wherein m represents an integer of 5 or more; k represents 1 or 2; $Ar^1$, $Ar^2$, $A^{3a}$ and $Ar^{3b}$ each independently represent divalent aromatic groups, which may have a hydrocarbon group having 1 to 20 carbon atoms which may have a substituent, an alkoxy group having 1 to 20 carbon atoms which may have a substituent, an acyl group having 1 to 20 carbon atoms which may have a substituent, an aryloxy group having 6 to 20 carbon atoms which may have a substituent, or an aryl carbonyl group having 7 to 20 carbon atoms which may have a substituent; at least one of $Ar^1$ and $Ar^2$ has an ion exchange group; $Ar^3a$ and $Ar^{3b}$ may have an ion exchange group or not; R represents an oxygen atom, an alkylene group having 1 to 6 carbon atoms or a fluoro-substituted alkylene group having 1 to 6 carbon atoms; and, in the case of a plurality of R's, they may be the same or different, and the segment has ion exchange group density of 4.0 meq/g or more, and at least one of the segments having substantially no ion exchange group is the segment represented by the following general formula (2):

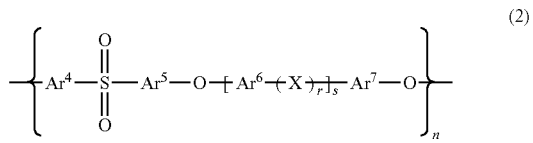

wherein n represents an integer of 5 or more; $Ar^4$, $Ar^5$, $Ar^6$, and $Ar^7$ each independently represent divalent aromatic groups, which may have a hydrocarbon group having 1 to 20 carbon atoms which may have a substituent, an alkoxy group having 1 to 20 carbon atoms which may have a substituent, an acyl group having 1 to 20 carbon atoms which may have a substituent, an aryloxy group having 6 to 20 carbon atoms which may have a substituent, an aryl carbny group having 7 to 20 carbon atoms which may have a substituent or a fluoro group; r Represents 0 or 1 and s represents 0, 1 or 2; X represents a direct bond or a divalent group selected from:

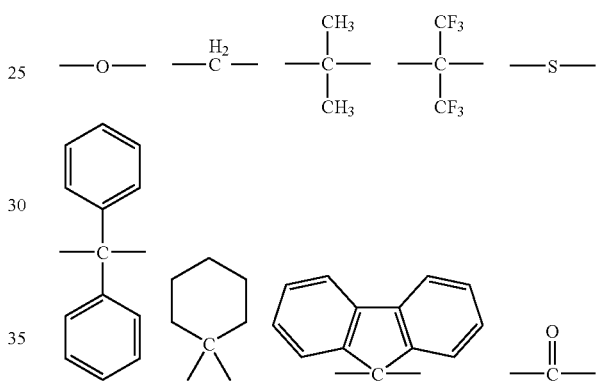

and, in the case of a plurality of X's, they may be the same or different.

2. The block copolymer according to claim 1, wherein the weight composition ratio of the segments having an ion exchange group to the segments having substantially no ion exchange group is represented by [segments having an ion exchange group]/(segments having substantially no ion exchange group] and is 3/97 to 70/30.

3. The block copolymer according to claim 1, wherein the ion exchange group is an acid group.

4. The block copolymer according to claim 1, wherein the ion exchange group is a strong acid group or a super strong acid group.

5. The block copolymer according to claim 1, wherein the ion exchange group is a sulfonic acid group.

6. The block copolymer according to claim 1, wherein at least one of the segments having an ion exchange group is the segment represented by the following general formula (4):

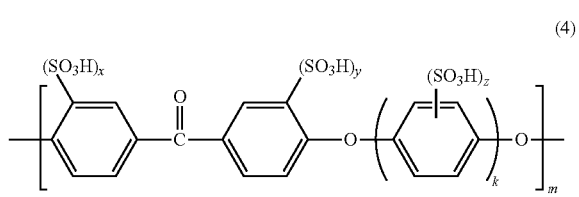

wherein m and k represent the same meaning as above; x represents 0 or 1; y represents 0 or 1; x+y is 1 or 2; and z represents 0, 1 or 2.

7. The block copolymer according to claim 1 wherein the ion exchange capacity is 0.5 meq/g to 4.0 meq/g.

8. A polymer electrolyte comprising the block copolymer according to claim 1 as a main component.

9. A polymer electrolyte membrane comprising the polymer electrolyte according to claim 8.

10. A polymer electrolyte fuel cell having at least one membrane among the polymer electrolyte membrane according to claim 9.

* * * * *